United States Patent
Yang et al.

(10) Patent No.: US 11,345,973 B2
(45) Date of Patent: May 31, 2022

(54) HIGH-STRENGTH STEEL SHEET AND METHOD FOR MANUFACTURING THE SAME

(71) Applicant: JFE Steel Corporation, Tokyo (JP)

(72) Inventors: Lingling Yang, Tokyo (JP); Tatsuya Nakagaito, Tokyo (JP); Gosuke Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 109 days.

(21) Appl. No.: 16/754,508

(22) PCT Filed: Mar. 29, 2018

(86) PCT No.: PCT/JP2018/013074
§ 371 (c)(1),
(2) Date: Apr. 8, 2020

(87) PCT Pub. No.: WO2019/077777
PCT Pub. Date: Apr. 25, 2019

(65) Prior Publication Data
US 2020/0308665 A1    Oct. 1, 2020

(30) Foreign Application Priority Data
Oct. 20, 2017   (JP) .............. JP2017-203019

(51) Int. Cl.
| C21D 9/46 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/14 | (2006.01) |
| C22C 38/16 | (2006.01) |
| C22C 38/26 | (2006.01) |
| C22C 38/28 | (2006.01) |
| C22C 38/32 | (2006.01) |

(Continued)

(52) U.S. Cl.
CPC .............. *C21D 9/46* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/38* (2013.01); *C22C 38/60* (2013.01); *C23C 2/02* (2013.01); *C23C 2/12* (2013.01); *C23C 2/28* (2013.01); *C23C 2/40* (2013.01); *C21D 2211/005* (2013.01); *C21D 2211/008* (2013.01)

(58) Field of Classification Search
CPC ............ B32B 15/013; C21D 2211/005; C21D 2211/008; C21D 6/005; C21D 6/008; C21D 8/0205; C21D 8/0226; C21D 8/0236; C21D 8/0247; C21D 8/0268; C21D 9/46; C22C 38/00; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/26; C22C 38/28; C22C 38/32; C22C 38/38; C22C 38/60; C23C 2/02; C23C 2/12; C23C 2/28; C23C 2/40
See application file for complete search history.

(56) References Cited

U.S. PATENT DOCUMENTS 8,828,557 B2   9/2014   Takagi et al.
9,702,035 B2   7/2017   Kawata et al.
(Continued)

FOREIGN PATENT DOCUMENTS

| CN | 101932742 A | 12/2010 |
| CN | 103642542 A | 6/2014 |

(Continued)

OTHER PUBLICATIONS

Extended European Search Repor for European Application No. 18869192.7, dated Jun. 16, 2020, 13 pages.

(Continued)

*Primary Examiner* — Jenny R Wu
(74) *Attorney, Agent, or Firm* — RatnerPrestia

(57) ABSTRACT

Provided are a high-strength steel sheet having a yield strength of 550 MPa or more and excellent fatigue-strength of a weld and a method for manufacturing the steel sheet. A high-strength steel sheet has a specified chemical composition, a steel microstructure observed in a cross section in a thickness direction parallel to a rolling direction including 40% to 75% of a martensite phase in terms of volume fraction, in which a total volume fraction of martensite grains whose average grain diameter ratios with respect to adjacent ferrite grains are ¼ or more and 1 or less is 60% or more with respect to an entire martensite phase, and a yield strength (YP) of 550 MPa or more.

8 Claims, No Drawings

(51) Int. Cl.
*C22C 38/38* (2006.01)
*C22C 38/60* (2006.01)
*C23C 2/02* (2006.01)
*C23C 2/12* (2006.01)
*C23C 2/28* (2006.01)
*C23C 2/40* (2006.01)

(56) References Cited

U.S. PATENT DOCUMENTS

| | | |
|---|---|---|
| 10,196,727 B2 | 2/2019 | Takagi et al. |
| 2010/0132843 A1 | 6/2010 | Ikeda et al. |
| 2010/0314009 A1* | 12/2010 | Kaneko ............... C23C 2/06 148/533 |
| 2011/0240176 A1 | 10/2011 | Kaneko et al. |
| 2012/0040203 A1 | 2/2012 | Takagi et al. |
| 2014/0022755 A1 | 1/2014 | Saito |
| 2016/0312329 A1 | 10/2016 | Hasegawa et al. |
| 2017/0044640 A1 | 2/2017 | Kimura et al. |
| 2017/0137906 A1 | 5/2017 | Fan et al. |
| 2017/0152530 A1 | 6/2017 | Kimura et al. |
| 2019/0185955 A1 | 6/2019 | Yang et al. |
| 2019/0211413 A1 | 7/2019 | Yang et al. |
| 2019/0366435 A1* | 12/2019 | Firdosy ............... B33Y 10/00 |

FOREIGN PATENT DOCUMENTS

| | | |
|---|---|---|
| CN | 103857814 A | 6/2014 |
| EP | 223359 A1 | 9/2010 |
| EP | 2762579 A1 | 8/2014 |
| JP | 2006342373 A | 12/2006 |
| JP | 2008291304 A | 12/2008 |
| JP | 2010126787 A | 6/2010 |
| JP | 4924730 B2 | 4/2012 |
| JP | 5412746 B2 | 2/2014 |
| JP | 5434960 B2 | 3/2014 |
| JP | 2016188395 A | 11/2016 |
| JP | 2017520681 A | 7/2017 |
| WO | 2013047755 A1 | 4/2013 |
| WO | 2615092982 A1 | 6/2015 |
| WO | 2018043452 A1 | 3/2018 |
| WO | 2018062342 A1 | 4/2018 |

OTHER PUBLICATIONS

Chinese Office Action with Search Report for Chinese Application No. 201880067488.6, dated Mar. 3, 2021, 11 pages.
International Search Report and Written Opinion for International Application No. PCT/JP2018/013074, dated Jun. 26, 2018, 7 pages.
Chinese Office Action for Chinese Application No. 201880067488. 6, dated Sep. 9, 2021, with Office Action, 8 pages.
Korean Office Action for Korean Application No. 10-2020-7010173, dated Sep. 6, 2021, with Office Action, 6 pages.
Chinese Office Action for Chinese Application No. 201880067488. 6, dated Dec. 30, 2021, with Office Action, 7 pages.

* cited by examiner

HIGH-STRENGTH STEEL SHEET AND METHOD FOR MANUFACTURING THE SAME

CROSS REFERENCE TO RELATED APPLICATIONS

This is the U.S. National Phase application of PCT/JP2018/013074, filed Mar. 29, 2018, which claims priority to Japanese Patent Application No. 2017-203019, filed Oct. 20, 2017, the disclosures of each of these applications being incorporated herein by reference in their entireties for all purposes.

FIELD OF THE INVENTION

The present invention relates to a high-strength steel sheet which is used mainly as a material for automobile parts and a method for manufacturing the steel sheet. In more detail, the present invention relates to a high-strength steel sheet having yield strength of 550 MPa or more and excellent fatigue property of a weld and a method for manufacturing the steel sheet.

BACKGROUND OF THE INVENTION

Nowadays, in the vehicle industry, for example, in the automobile industry, increasing the fuel efficiency of automobiles to decrease the amount of carbon dioxide gas ($CO_2$) emission is always an important issue to be addressed from the viewpoint of global environment conservation. Reducing the weight of automobile bodies is effective for increasing the fuel efficiency of automobiles. It is necessary to achieve such weight reduction while maintaining satisfactory strength of automobile bodies. It is possible to achieve weight reduction in the case where, by increasing the strength of a steel sheet which is used as a material for automobile parts, an automobile structure can be simplified to decrease the number of parts.

However, in the case of a high-strength steel sheet having yield strength of 550 MPa or more, large amounts of alloy elements, which are necessary to increase strength, are typically added. Therefore, it is necessary to take measures to inhibit deterioration in weldability due to such alloy elements.

Patent Literature 1 discloses a high-strength cold-rolled steel sheet having excellent weldability and workability and a method for manufacturing the steel sheet. In addition, Patent Literature 2 discloses a high-strength hot-dip galvanized steel sheet having a tensile strength of 980 MPa or more and excellent bendability and weldability and a method for manufacturing the steel sheet. In addition, Patent Literature 3 discloses a high-strength hot-dip coated steel sheet having a tensile strength of 980 MPa or more and excellent workability, weldability, and fatigue property and a method for manufacturing the steel sheet. In addition, Patent Literature 4 discloses a high-strength steel sheet having a tensile strength of 780 MPa or more and excellent weldability and stretch flange formability and a method for manufacturing the steel sheet.

PATENT LITERATURE

PTL 1: Japanese Unexamined Patent Application Publication No. 2016-188395
PTL 2: Japanese Patent No. 5434960
PTL 3: Japanese Patent No. 4924730
PTL 4: Japanese Patent No. 5412746

SUMMARY OF THE INVENTION

In the case of a high-strength steel sheet, since there is insufficient toughness of a weld, in particular, the toughness of a heat-affected zone in a vicinity of a molten and solidified weld metal, which is called a nugget when resistance spot welding is performed, there is a decrease in the fatigue-strength of a weld. In the case where it is possible to inhibit a decrease in the fatigue-strength of a weld, it is possible to sufficiently maintain the collision strength of a whole automobile body. In the case of conventional techniques including those according to Patent Literature 1 through Patent Literature 4 described above, such fatigue-strength of a weld is not regarded as an immediate object, whereas consideration is given to weldability.

The high-strength cold-rolled steel sheet described in Patent Literature 1 is suitable for a weld and an impact energy-absorbing member. However, since fracturing occurs due to a decrease in the fatigue-strength of a weld after the weld has been deformed, there is a practical issue to be solved.

The high-strength hot-dip coated steel sheet described in Patent Literature 2 is effectively resistant to conventional static tensile shear. However, it would be more preferable if it were possible to inhibit a decrease in the fatigue-strength of a weld after the weld has been deformed.

The high-strength hot-dip coated steel sheet as described in Patent Literature 3 is effectively resistant to conventional static tensile shear. However, it would be more preferable if it were possible to inhibit a decrease in the fatigue-strength of a weld after the weld has been deformed.

The high-strength steel sheet as described in Patent Literature 4 is effectively resistant to conventional static tensile shear. However, it would be more preferable if it were possible to inhibit a decrease in the fatigue-strength of a weld after the weld has been deformed.

As described above, in the case of all of the conventional techniques, there is an issue to be solved regarding the fatigue-strength of a weld when the weld is deformed.

The present invention is intended to advantageously solve the issue of the conventional techniques described above, and an object of the present invention is to provide a high-strength steel sheet having yield strength of 550 MPa or more and excellent fatigue-strength of a weld and a method for manufacturing the steel sheet.

To achieve the object described above, the present inventors diligently conducted investigations regarding the fatigue-strength of a resistance spot weld and, as a result, obtained the following knowledge by experimenting with various microstructures, which have yet to be subjected to welding heat for increasing the toughness of a heat-affected zone.

(Knowledge 1) It is possible to inhibit crack generation due to a spot weld being deformed by controlling a microstructure in a rolling direction to be a steel microstructure including 40% to 75% of a martensite phase in terms of volume fraction, in which the total volume fraction of martensite grains whose average grain diameters are ¼ or more and 1 or less times that of adjacent ferrite grains is 60% or more with respect to the entire martensite phase.

(Knowledge 2) Since hard martensite tends to be subjected to stress in a heat-affected zone, in the case where grain diameters of adjacent ferrite grains are small, voids tend to be generated around the martensite when the heat-affected zone is deformed, and a crack tends to be generated around a nugget due to the voids combining with each other.

More specifically, the present invention according to exemplary embodiments provides the following.

[1] A high-strength steel sheet having a chemical composition containing, by mass %, C: 0.05% to 0.15%, Si: 0.01% to 1.80%, Mn: 1.8% to 3.2%, P: 0.05% or less, S: 0.020% or less, Al: 0.01% to 2.0%, N: 0.010% or less, one or more of B: 0.0001% to 0.005%, Ti: 0.005% to 0.04%, and Nb: 0.005% to 0.06%, and a balance being Fe and inevitable impurities, a steel microstructure observed in a cross section in a thickness direction parallel to a rolling direction including 40% to 75% of a martensite phase in terms of volume fraction, in which a total volume fraction of martensite grains whose average grain diameter ratios with respect to adjacent ferrite grains are ¼ or more and 1 or less is 60% or more with respect to an entire martensite phase, and a yield strength (YP) of 550 MPa or more.

[2] The high-strength steel sheet according to item [1], in which the chemical composition further contains, by mass %, one or both of Mo: 0.03% to 0.50% and Cr: 0.1% to 1.0% in a total amount of 1% or less.

[3] The high-strength steel sheet according to item [1] or [2], in which the chemical composition further contains, by mass %, one or more of Cu, Ni, Sn, As, Sb, Ca, Mg, Pb, Co, Ta, W, REM, Zn, V, Sr, Cs, and Hf in a total amount of 0.5% or less.

[4] The high-strength steel sheet according to any one of items [1] to [3], in which the steel sheet further has a coating layer on a surface of the steel sheet.

[5] A method for manufacturing a high-strength steel sheet, the method including a hot rolling process of performing hot rolling a steel slab having the chemical composition according to any one of items [1] to [3], cooling the hot-rolled steel sheet at an average cooling rate of 10° C./s to 30° C./s, and coiling the cooled steel sheet at a coiling temperature of 470° C. to 700° C., a cold rolling process of performing cold rolling the hot-rolled steel sheet obtained in the hot rolling process, and an annealing process of heating the cold-rolled steel sheet obtained in the cold rolling process to an annealing temperature range of 750° C. to 900° C., annealing the heated steel sheet for an annealing time of 30 seconds to 200 seconds, cooling the annealed steel sheet to a temperature of 600° C. at an average cooling rate of 10° C./s to 40° C./s while performing reverse bending through rolls having a radius of 1500 mm or less one or more times and 4 times or less in total, further cooling the steel sheet to a cooling stop temperature of 400° C. to 600° C., and holding at the cooling stop temperature for 2 seconds to 200 seconds.

[6] The method for manufacturing a high-strength steel sheet according to item [5], the method further including a coating process of performing a coating treatment on a surface of the steel sheet after the annealing process.

According to the present invention, it is possible to obtain a high-strength hot-dip coated steel sheet having yield strength of 550 MPa or more and excellent fatigue-strength of a resistance spot weld.

DETAILED DESCRIPTION OF EMBODIMENTS OF THE INVENTION

Hereafter, the embodiments of the present invention will be described. The present invention is not limited to the embodiments described below. In the description below, "%" used when describing the contents of the constituents refers to "mass %".

C: 0.05% to 0.15%

C is an element which is necessary to increase strength by forming martensite. In the case where the C content is less than 0.05%, since the hardness of martensite is low, yield strength of 550 MPa or more is not achieved. Therefore, the C content is set to be 0.05% or more, preferably 0.06% or more, or more preferably 0.07% or more. In particular, in the case where the C content is 0.07% or more, it is possible to achieve satisfactory fatigue-strength of a weld represented by a result of 300 N or more in a cross tensile test. On the other hand, in the case where the C content is more than 0.15%, since a large amount of cementite is formed in a heat-affected zone, there is a decrease in the toughness of a portion in the heat-affected zone in which the cementite transforms into martensite, which results in a decrease in the fatigue-strength in a weld. In addition, in the case where the C content is more than 0.15%, there may be a case where the total volume fraction of martensite grains whose average ratios, which will be described below, are ¼ or more and 1 or less is out of the desired range. Therefore, the C content is set to be 0.15% or less, preferably 0.13% or less, or more preferably 0.11% or less. In particular, in the case where the C content is 0.11% or less, it is possible to achieve satisfactory fatigue-strength of a weld represented by a result of 300 N or more in a cross tensile test.

Si: 0.01% to 1.80%

Si is an element which has the function of increasing a hardness of a steel sheet through solid solution strengthening. To stably achieve satisfactory yield strength, it is necessary that the Si content be 0.01% or more, preferably 0.10% or more, or more preferably 0.35% or more. In the case where the Si content is 0.35% or more, it is possible to achieve satisfactory fatigue-strength of a weld represented by a result of 300 N or more in a cross tensile test. It is even more preferable that the Si content be 0.51% or more. On the other hand, in the case where the Si content is more than 1.80%, since there is a decrease in the toughness of a weld, there is a decrease in the fatigue-strength of a weld. Therefore, the upper limit of the Si content is set to be 1.80% or less, preferably 1.40% or less, more preferably 1.20% or less, or most preferably 1.00% or less. In the case where the Si content is 1.00% or less, it is possible to achieve satisfactory fatigue-strength of a weld represented by a result of 300 N or more in a cross tensile test.

Mn: 1.8% to 3.2%

Mn is an element which has a function of increasing a hardness of a steel sheet through solid solution strengthening and which increases strength of a material by promoting the formation of martensite as a result of inhibiting ferrite transformation, bainite transformation, and the like. To stably achieve satisfactory yield strength, it is necessary that the Mn content be 1.8% or more, preferably 2.1% or more, or more preferably 2.2% or more. In the case where the Mn content is 2.2% or more, it is possible to achieve satisfactory fatigue-strength of a weld represented by a result of 300 N or more in a cross tensile test. On the other hand, in the case where the Mn content is large, cementite is formed when tempering is performed, and there is a decrease in the fatigue-strength of a weld due to a decrease in the toughness of a heat-affected zone. Therefore, the upper limit of the Mn content is set to be 3.2%, preferably 3.1% or less, or more preferably 2.9% or less. In the case where the Mn content is 2.9% or less, it is possible to achieve satisfactory fatigue-strength of a weld represented by a result of 300 N or more in a cross tensile test.

P: 0.05% or less

P decreases toughness as a result of being segregated at grain boundaries. Therefore, the upper limit of the P content is set to be 0.05% or less, preferably 0.03% or less, or more preferably 0.02% or less. There is no particular limitation on the lower limit of the P content, and it is preferable that the P content be as small as possible. However, it is preferable that the P content be 0.0001% or more from the viewpoint of manufacturability.

S: 0.020% or less

S decreases toughness as a result of combining with Mn to form MnS having a coarse grain size. Therefore, it is preferable that the S content be decreased. It is sufficient that the S content be 0.020% or less, preferably 0.010% or less, or more preferably 0.002% or less. There is no particular limitation on the lower limit of the S content, and it is preferable that the S content be as small as possible. However, it is preferable that the S content be 0.0001% or more from the viewpoint of manufacturability.

Al: 0.01% to 2.0%

Since there is a decrease in toughness in the case where large amounts of oxides exist in steel, deoxidation is important. In addition, Al may inhibit the precipitation of cementite. To realize such effects, it is necessary that the Al content be 0.01% or more, preferably 0.02% or more, or more preferably 0.03% or more. On the other hand, in the case where the Al content is more than 2.0%, since coagulation coarsening of oxides and nitrides occurs, there is a decrease in toughness. Therefore, the upper limit of the Al content is set to be 2.0% or less, preferably 1.5% or less, or more preferably 0.1% or less.

N: 0.010% or less

Since N is a harmful element in embodiments of the present invention, it is preferable that the N content be decreased as much as possible. N combines with Ti to form TiN, and, in the case where the N content is more than 0.010%, there is a decrease in toughness of a weld due to an increase in the amount of TiN formed. Therefore, the N content is set to be 0.010% or less, preferably 0.008% or less, or more preferably 0.006% or less.

One or more of B: 0.0001% to 0.005%, Ti: 0.005% to 0.04%, and Nb: 0.005% to 0.06% or less is/are contained.

B: 0.0001% to 0.005%

B is an element which is necessary for increasing toughness by strengthening grain boundaries. To sufficiently realize such an effect, it is necessary that the B content be 0.0001% or more or preferably 0.001% or more. On the other hand, in the case where the B content is more than 0.005%, since B forms $Fe_{23}(CB)_6$, there is a decrease in toughness. Therefore, the B content is set to be 0.005% or less or preferably 0.004% or less.

Ti: 0.005% to 0.04%

Ti combines with N to form nitrides, thereby bringing out the effect of B as a result of inhibiting the formation of BN. In addition, there is an increase in toughness due to a decrease in crystal grain diameter as a result of the formation of TiN. To realize such effects, it is necessary that the Ti content be 0.005% or more or preferably 0.010% or more. On the other hand, in the case where the Ti content is more than 0.04%, such effects become saturated, and it is difficult to stably manufacture a steel sheet due to an increase in rolling load. Therefore, the Ti content is set to be 0.04% or less or preferably 0.03% or less.

Nb: 0.005% to 0.06%

Nb is an element which further increases the effects of the present invention. Nb increases the toughness of a heat-affected zone by decreasing the grain diameter of martensite and by suppressing coarsening the crystal grain in the heat-affected zone. To realize such effects, it is necessary that the Nb content be 0.005% or more or preferably 0.010% or more. On the other hand, in the case where the Nb content is more than 0.06%, the total volume fraction of martensite grains whose average ratios, which will be described below, are ¼ or more and 1 or less is out of the desired range, and there is a decrease, rather than an increase, in toughness due to precipitation of Nb carbides. Therefore, the Nb content is limited to be 0.06% or less or preferably 0.04% or less. In the case where the Nb content is 0.04% or less, it is possible to achieve satisfactory fatigue-strength of a weld represented by a result of 300 N or more in a cross tensile test. In addition, it is possible to increase strength of a weld joint by inhibiting the liquid-metal embrittlement occurring in the weld joint.

Here, it is sufficient that at least one of B, Ti, and Nb described above be contained. In the case where the content of any one of these elements is within the range described above and other elements are contained in amounts less than the corresponding lower limits, such other elements contained in amounts less than the corresponding lower limits are regarded as being contained as inevitable impurities.

The chemical composition described above may further contain one or both of Mo: 0.03% to 0.50% and Cr: 0.1% to 1.0% as optional constituents in total amount of 1% or less.

Mo: 0.03% to 0.50%

Mo decreases the grain diameter of martensite by promoting the nucleation of austenite. To realize such an effect, it is necessary that the Mo content be 0.03% or more or preferably 0.04% or more. On the other hand, in the case where Mo is segregated at grain boundaries, since ferrite grain growth is stopped, there is an excessive decrease in the grain diameter of ferrite. To inhibit such an excessive decrease, the Mo content is set to be 0.50% or less or preferably 0.30% or less.

Cr: 0.1% to 1.0%

Cr is an element which is effective for inhibiting temper embrittlement. Therefore, containing Cr further increases the effects of the present invention. To realize such a further increase in effects, the Cr content is set to be 0.1% or more or preferably 0.2% or more. However, in the case where the Cr content is more than 1.0%, there is a decrease in the toughness of a heat-affected zone due to the formation of Cr carbides. Therefore, the Cr content is set to be 1.0% or less or preferably 0.5% or less.

In addition, since there is a decrease in the toughness of a weld in the case where there is an increase in the amount of hard martensite, it is necessary that the total contents of Cr and Mo be 1% or less.

The chemical composition of the high-strength steel sheet according to embodiments of the present invention may contain one or more of Cu, Ni, Sn, As, Sb, Ca, Mg, Pb, Co, Ta, W, REM, Zn, V, Sr, Cs, and Hf as optional constituents in a total amount of 0.5% or less, preferably 0.1% or less, or more preferably 0.03% or less. In addition, constituents other than those described above are Fe and inevitable impurities.

Incidentally, regarding the optional constituents, in the case where the lower limit of the content of some element is described and such an element is contained in an amount less than the lower limit, there is no decrease in the effects of the present invention. Therefore, such an optional element which is contained in an amount less than the lower limit is regarded as being contained as an inevitable impurity.

Although the range of the chemical composition of a steel sheet has been described above, only controlling the chemical composition to be within the range described above is not sufficient for realizing the intended effects in the present invention, and it is important to control a steel microstructure so as to satisfy the specified conditions. Such specified conditions regarding a steel microstructure will be described. The volume fraction, the average grain diameter ratio, and the average grain diameter described below are determined by using the methods described in EXAMPLE.

Volume fraction of martensite phase observed in cross section in thickness direction parallel to rolling direction: 40% to 75%

A martensite phase is a hard phase and has the function of increasing the strength of a steel sheet through transformation microstructure strengthening. In addition, to achieve yield strength of 550 MPa or more, it is necessary that the volume fraction of a martensite phase be 40% or more, preferably 45% or more, or more preferably 50% or more. On the other hand, in the case where the volume fraction is more than 75%, there is a decrease in the toughness of a heat-affected zone. Therefore, the volume fraction of a martensite phase is set to be 75% or less, preferably 70% or less, more preferably 65% or less, or even more preferably 59% or less. Here, the expression "volume fraction of a martensite phase" described above denotes the total volume fraction of as-quenched martensite (martensite which has yet to be tempered) and tempered martensite.

In addition to a martensite phase, a ferrite phase is included. Although there is no particular limitation on the volume fraction of a ferrite phase, it is preferable that the volume fraction of a ferrite phase be 25% to 60%. It is more preferable that the lower limit of the volume fraction of a ferrite phase be 30% or more or even more preferably 35% or more. It is more preferable that the upper limit of the volume fraction of a ferrite phase be 55% or less or even more preferably 50% or less.

In addition, in the steel microstructure of the high-strength steel sheet according to embodiments of the present invention, bainite, pearlite, and retained austenite may be included in addition to martensite and ferrite. It is acceptable that the total volume fraction of such additional phases be 10% or less.

Total volume fraction, with respect to entire martensite phase, of martensite grains whose average grain diameter ratios with respect to adjacent ferrite grains are ¼ or more and 1 or less: 60% or more In the case where there is an increase in the total volume fraction of martensite grains whose average grain diameter ratios ((martensite grain diameter)/(ferrite grain diameter)) with respect to adjacent ferrite grains are less than ¼, there is a decrease in the strength of a weld due to grain growth in a HAZ. Therefore, the average ratio described above is set to be ¼ or more. On the other hand, in the case where there is an increase in the total volume fraction of martensite grains whose average ratios described above are more than 1, since martensite grains tend to be subjected to stress concentration, voids are generated around the martensite grains, which results in a decrease in the fatigue-strength of a weld. Therefore, the total volume fraction of martensite grains whose average grain diameter ratios with respect to adjacent ferrite grains are ¼ or more and 1 or less is set to be 60% or more. Although there is no particular limitation on the upper limit of the volume fraction, it is preferable that the volume fraction be 90% or less, more preferably 85% or less, or even more preferably 80% or less.

Here, the expression "ferrite grains adjacent to martensite grains" denotes ferrite grains adjacent to martensite grains observed in a cross section in the thickness direction parallel to the rolling direction as described below. In addition, the expression "the average grain diameter ratio of a martensite grain with respect to adjacent ferrite grains" denotes a value obtained during observation of the cross section in the thickness direction by calculating the ratio of the grain diameter of a martensite grain to the grain diameter of each of the adjacent ferrite grains and by calculating the average value of the calculated grain diameter ratios. For example, in the case where the number of ferrite grains adjacent to a martensite grain is three, the average grain diameter ratio of the martensite grain with respect to the adjacent ferrite grains is obtained by calculating the ratio of the grain diameter of the martensite grain to the grain diameter of each of the three ferrite grains and calculating the average value of the three calculated grain diameter ratios.

In an embodiment of the present invention, it is sufficient that the total volume fraction, with respect to the entire martensite phase, of martensite grains whose average grain diameter ratios with respect to adjacent ferrite grains are ¼ or more and 1 or less be within the range described above, and there is no particular limitation on the average grain diameter of martensite grains or the average grain diameter of ferrite grains. In the present invention, it is preferable that the average grain diameter of martensite grains be 1 μm to 8 μm. It is preferable that the lower limit of the average grain diameter of martensite be 2 μm or more or more preferably 3 μm or more. It is preferable that the upper limit of the average grain diameter of martensite grains be 7 μm or less or more preferably 5 μm or less. It is preferable that the average grain diameter of ferrite grains be 3 μm to 15 μm. It is preferable that the lower limit of the average grain diameter of ferrite grains be 4 μm or more or more preferably 5 μm or more. It is preferable that the upper limit of the average grain diameter of ferrite grains be 10 μm or less or more preferably 9 μm or less.

The high-strength steel sheet according to embodiments of the present invention has a yield strength YP of 550 MPa or more, preferably 560 MPa or more, or more preferably 570 MPa or more. It is preferable that the upper limit of the YP be 800 MPa or less, more preferably 750 MPa or less, or even more preferably 700 MPa or less in consideration of, for example, a balance with other properties and the ease of achieving the desired microstructure.

Regarding one of the other tensile properties, it is preferable that the tensile strength (TS) be 950 MPa or more, more preferably 980 MPa or more, or even more preferably 1000 MPa or more. It is preferable that the upper limit of the tensile strength be 1200 MPa or less, more preferably 1150 MPa or less, or even more preferably 1100 MPa or less in consideration of, for example, a balance with other properties and the ease of achieving the desired microstructure.

Regarding one of the other tensile properties, it is preferable that the butt elongation (El) be 14.0% or more, more preferably 14.5% or more, or even more preferably 15.0% or more. It is preferable that the El be 20.0% or less, more preferably 19.0% or less, or even more preferably 18.0% or less in consideration of, for example, a balance with other properties and the ease of achieving the desired microstructure.

The high-strength steel sheet according to embodiments of the present invention has excellent fatigue-strength of a weld. Specifically, the steel sheet has a cross tensile force, which is determined by using the method described in EXAMPLE, of 250 N or more, preferably 275 N or more, or more preferably 300 N or more. It is preferable that the upper limit of the cross tensile force be 500 N or less, more preferably 450 N or less, or even more preferably 400 N or less in consideration of, for example, a balance with other properties and the ease of achieving the desired microstructure.

The tensile properties described above are determined by using the methods described in EXAMPLE.

The high-strength steel sheet according to embodiments of the present invention may be a high-strength steel sheet having a coating layer on the surface thereof. Examples of a coating layer include a galvanizing layer, an electrogalvanizing layer, and a hot-dip aluminum coating layer. In addition, the coating layer may be a galvannealing layer, which is formed by performing an alloying treatment after a galvanizing treatment has been performed.

Hereafter, the method for manufacturing the high-strength steel sheet according to embodiments of the present invention will be described.

The method for manufacturing the high-strength steel sheet according to embodiments of the present invention includes a hot rolling process, a cold rolling process, and an annealing process. In addition, the manufacturing method according to embodiments of the present invention further includes a coating process in the case of a high-strength steel sheet having a coating layer. Hereafter, these processes will be described.

The hot rolling process is a process of performing hot rolling on a steel slab having the chemical composition described above, cooling the hot-rolled steel sheet at an average cooling rate of 10° C./s to 30° C./s, and coiling the cooled steel sheet at a coiling temperature of 470° C. to 700° C.

In embodiments of the present invention, there is no particular limitation on the method used for preparing molten steel for a steel material (steel slab), and a known method, such as one using a converter or an electric furnace, may be used. In addition, after the molten steel has been prepared, it is preferable that a steel material be manufactured by using a continuous casting method from the viewpoint of, for example, a problem of segregation and the same. However, the slab may be manufactured by using a known casting method, such as an ingot casting-slabbing method or a thin-slab continuous casting method. Incidentally, when hot rolling is performed on a slab after casting has been performed, hot rolling may be performed after the slab has been reheated in a heating furnace, or the slab may be subjected to hot direct rolling without being heated in the case where the slab has a temperature equal to or higher than a predetermined temperature.

The steel material obtained as described above is subjected to hot rolling including rough rolling and finish rolling, and, in embodiments of the present invention, it is necessary to dissolve carbides in the steel material before rough rolling is performed. In the case where the slab is heated, it is preferable that the slab be heated to a temperature of 1100° C. or higher to dissolve the carbides and to suppress an increase in rolling load. In addition, it is preferable that the slab heating temperature be 1300° C. or lower to suppress an increase in the amount of scale loss. In addition, in the case where the steel material which has yet to be subjected to rough rolling has a temperature equal to or higher than a predetermined temperature as described above and carbides in the steel material are dissolved, a process of heating the steel material which has yet to be subjected to rough rolling may be omitted. Here, it is not necessary to put particular limitations on the conditions applied for rough rolling and finish rolling. In embodiments of the present invention, it is preferable that the finishing delivery temperature be 850° C. to 1000° C.

Average cooling rate after finish rolling has been performed: 10° C./s to 30° C./s After finish rolling has been performed, in the case where the average cooling rate to a coiling temperature is lower than 10° C./s, since ferrite grains do not grow, there is a decrease in the toughness of a heat-affected zone. On the other hand, in the case where the average cooling rate is higher than 30° C./s, since ferrite grains grow excessively, there is a decrease in strength. Therefore, the average cooling rate described above is set to be 10° C./s to 30° C./s or preferably 15° C./s to 25° C./s.

Coiling temperature: 470° C. to 700° C.

In the case where the coiling temperature is lower than 470° C., since low-temperature-transformation phases, such as bainite, grow, the total volume fraction of martensite grains whose average ratios described above are ¼ or more and 1 or less is not within the desired range, which results in softening occurring in a heat-affected zone. On the other hand, in the case where the coiling temperature is higher than 700° C., there is a tendency for the corrosion resistance of a weld to deteriorate due to Si and Mn being diffused to the surface of a steel sheet, and there is a decrease in strength due to a tendency for pearlite to be formed. Therefore, the coiling temperature is set to be 470° C. to 700° C. or preferably 500° C. or higher to 600° C. or lower.

Subsequently, a cold rolling process is performed. The cold rolling process is a process of performing cold rolling the hot-rolled steel sheet obtained by using the method described above.

In the cold rolling process, there is no particular limitation on the rolling ratio. For example, it is preferable that the rolling reduction ratio be controlled to be 30% to 80%.

Subsequently, an annealing process is performed. The annealing process is a process of heating the cold-rolled steel sheet obtained in the cold rolling process to an annealing temperature range of 750° C. to 900° C., annealing the heated steel sheet for an annealing time of 30 seconds to 200 seconds, cooling the annealed steel sheet to a temperature of 600° C. at an average cooling rate of 10° C./s to 40° C./s while performing reverse bending through rolls having a radius of 1500 mm or less one or more times and 4 times or less in total, further cooling the steel sheet to a cooling stop temperature of 400° C. to 600° C., and holding the cooled steel sheet at the cooling stop temperature for 2 seconds to 200 seconds. Now, the term "reverse bending" means "bending in one direction, and bending in the opposite direction repeatedly.

Annealing temperature: 750° C. to 900° C.

Annealing time: 30 seconds (s) to 200 seconds (s) To form a steel microstructure including 40% to 75% of a martensite phase in terms of volume fraction, in which a total volume fraction of martensite grains whose average grain diameter ratios with respect to adjacent ferrite grains are ¼ or more and 1 or less is 60% or more, it is necessary to anneal the cold-rolled steel sheet by holding the steel sheet at an annealing temperature of 750° C. to 900° C. for 30 seconds to 200 seconds. In the case where the annealing temperature is lower than 750° C. or the annealing time is less than 30 seconds, since there is a decrease in the speed of recovery, it is not possible to achieve a sufficient volume fraction of martensite. On the other hand, in the case where the annealing temperature is higher than 900° C., since there is an increase in the volume fraction of a martensite phase, there is an increase in the tempering area, which results in a decrease in the toughness of a heat-affected zone. In addition, in the case where the annealing time is more than 200 seconds, there may be deterioration in ductility due to a large amount of iron carbides being precipitated. Therefore, the annealing temperature is set to be 750° C. to 900° C. or preferably 800° C. to 900° C., and the holding time is set to be 30 seconds to 200 seconds or preferably 50 seconds to 150 seconds.

After having held the steel sheet at the annealing temperature described above for the annealing time described above, cooling is performed to a temperature of 600° C. at an average cooling rate of 10° C./s to 40° C./s while performing reverse bending through rolls having a radius of 1500 mm or less one or more times and 4 times or less in total, and cooling is further performed to a cooling stop temperature of 400° C. to 600° C.

Average cooling rate to a temperature of 600° C.: 10° C./s to 40° C./s

In the case where the average cooling rate is more than 40° C./s, since ferrite grains do not grow, it is not possible to form a microstructure in which the total volume fraction of martensite grains whose average ratios described above are ¼ or more and 1 or less is 60% or more, which results in a decrease in the deformation strength of a weld. On the other hand, in the case where the average cooling rate is less than 10° C./s, since the ferrite grain growth progresses, there is a decrease in the toughness and fatigue-strength of a heat-affected zone. Therefore, the average cooling rate to a temperature of 600° C. is set to be 10° C./s to 40° C./s. Although there is no particular limitation on the average cooling rate from a temperature of 600° C. to the cooling stop temperature, it is preferable that the average cooling rate be controlled within a range of 20° C./s to 60° C./s.

Reverse bending through rolls having a radius of 1500 mm or less one or more times and 4 times or less in total It is not possible to form the desired steel microstructure by simply performing cooling only. In the case where the desired steel microstructure is not formed, there is a decrease in the fatigue-strength of a weld. Therefore, to form the desired steel microstructure, cooling is performed to a temperature of 600° C. at an average cooling rate of 10° C./s to 40° C./s while performing reverse bending in a high temperature range from the annealing temperature to a temperature of 600° C. It was found that it is possible to control the total volume fraction of martensite grains whose average ratios described above are ¼ or more and 1 or less by performing such reverse bending and the total volume fraction of martensite grains whose average ratios described above are ¼ or more and 1 or less relates to the fatigue-strength of a weld. To control the total volume fraction of martensite grains whose average ratios described above are ¼ or more and 1 or less to be within the desired range, it is necessary that the roll radius be 1500 mm or less. In addition, in the case where the number of reverse bending is 5 or more, the total volume fraction of martensite grains whose average ratios described above are ¼ or more and 1 or less is less than 60%. Therefore, the number of reverse bending is set to be 4 or less or preferably 3 or less. Here, the expression "number of reverse bending" denotes a number counted in such a manner that, instead of counting the number in unit of bending in one direction and bending in the opposite direction, counting the numbers of each bending in one direction and each bending in the opposite direction individually as one time.

Cooling stop temperature: 400° C. to 600° C.

Holding time: 2 seconds to 200 seconds In the case where cooling is performed to a temperature lower than 400° C., since there is an increase in the amount of tempered martensite, there is a decrease in strength. On the other hand, in the case where the cooling stop temperature is higher than 600° C., since the ferrite grain growth progresses, there is a decrease in the toughness and fatigue-strength of a heat-affected zone. In the case where the holding time is more than 200 seconds, there is a deterioration in productivity, and there is a decrease in strength due to bainite transformation progressing. On the other hand, in the case where the holding time is less than 2 seconds, the total volume fraction of martensite grains whose average ratios described above are ¼ or more and 1 or less is not within the desired range. Therefore, the cooling stop temperature is set to be 400° C. to 600° C., and the holding time at the cooling stop temperature is set to be 2 seconds to 200 seconds.

The manufacturing method according to embodiments of the present invention further includes a coating process in the case where the method for manufacturing a high-strength steel sheet according to embodiments of the present invention is a method for manufacturing a high-strength steel sheet having a coating layer on the surface thereof.

The coating process is a process of performing a coating treatment on the surface of a high-strength steel sheet. Regarding the method of a coating treatment, a commonly used method may be used in accordance with a coating layer to be formed. In addition, in the case of a galvanizing treatment, an alloying treatment may be performed.

Example 1

High-strength steel sheets were manufactured by performing hot rolling, cold rolling, and annealing on slabs having the chemical compositions given in Table 1 under the conditions given in Table 2. Here, in the case of Nos. 1, 2, 9, 10, 19, 20, 23, and 33, a coating treatment was performed.

(1) Microstructure Observation

A cross section in the thickness direction parallel to the rolling direction of the obtained steel sheet was polished and subjected to etching by using a 1% nital solution to expose a microstructure. In a region from the surface to a position located at ¼t of the thickness, the images of 10 fields of view were obtained by using a scanning electron microscope at a magnification of 2000 times, and observation was performed by using a cutting method in accordance with ASTM E 112-10. "t" denotes a thickness of the steel sheet. On the basis of the images described above, the area fraction of each phase was determined. This area fraction was defined as the volume fraction. Ferrite grains have a structure in which a corrosion mark or cementite is not observed. Martensite grains which have yet to be tempered have a structure in which cementite is not observed and which look lighter than ferrite grains. Tempered martensite grains have a structure in which corrosion marks and cementite are observed. The area fraction of each phase with respect to each observed fields of view was determined by image analysis, and the average value of the area fraction for the observed fields of view was calculated. Incidentally, in a region which was recognized as martensite which had yet to be tempered, a small amount of retained austenite is contained. Therefore, to distinguish martensite which had yet to be tempered from retained austenite, the volume fraction of a retained austenite phase was determined by grinding the steel sheet in the thickness direction to a position located at ¼ of the thickness, by further performing chemical polishing on the ground surface to remove a thickness of 200 μm or more, and by using X-ray intensity diffracted from the polished surface parallel to the surface of the steel sheet. The determination was performed by using the Kα ray of Mo as a radiation source and the peaks for (200)α, (211)α, (200)γ, (220)γ, and (311)γ. The obtained volume fraction of a retained austenite phase was regarded as equivalent to the area fractions of the steel sheet microstructure. In embodiments of the present invention, the area fraction (volume fraction) of martensite was calculated by adding the area fraction of tempered martensite to a value calculated by subtracting the area fraction of retained austenite from the area fraction of martensite which had yet to be tempered. Here, bainite and pearlite were recognized as other phases.

By using the images used to determine the volume fractions as described above, and by using Image-Pro produced by Media Cybernetics, Inc., the total volume fraction, with respect to the entire martensite phase, of martensite grains whose average grain diameter ratios with respect to adjacent ferrite grains are ¼ or more and 1 or less was determined.

By using the images used to determine the volume fractions as described above, by using a scanning electron microscope (SEM) to obtain images of 10 fields of view at a magnification of 1000 times, and by using a cutting method in accordance with ASTM E 112-10, the average grain diameter of martensite and the average grain diameter of ferrite were determined. The calculated average grain diameter of martensite and average grain diameter of ferrite are given in Table 3.

(2) Tensile Properties

A tensile test was performed in accordance with JIS Z 2241 5 times on JIS No. 5 test pieces in accordance with JIS Z 2201 whose longitudinal direction (tensile direction) was a direction perpendicular to the rolling direction (width direction) to obtain average yield strength (YP), tensile strength (TS), and butt elongation (EL). The calculated results are given in Table 3.

(3) Fatigue Test of Weld

First, spot welding was performed under the following conditions. A cross tensile test piece was prepared by performing spot welding with an electrode specified as DR6 mm-40R, a pressing load of 4802 N (490 kgf), an energizing time of 17 cycles, and a current value controlled so that the nugget diameter was 6.5 mm. Subsequently, the fatigue limit was determined by performing a cross tensile test in accordance with JIS Z 3137 with the number of cycles of 10^6 and a testing frequency of 20 Hz. The results are given in Table 3.

TABLE 1

| Steel Code | Chemical Composition (mass %) | | | | | | | | | | |
|---|---|---|---|---|---|---|---|---|---|---|---|
| | C | Si | Mn | P | S | Al | N | B | Ti | Nb | Other |
| A | 0.083 | 0.61 | 2.62 | 0.01 | 0.001 | 0.03 | 0.003 | 0.002 | 0.02 | 0.015 | — |
| B | 0.086 | 0.65 | 2.68 | 0.02 | 0.001 | 0.03 | 0.004 | 0.002 | — | 0.018 | Sn: 0.006, Cu: 0.05 |
| C | 0.092 | 0.53 | 2.72 | 0.02 | 0.002 | 0.04 | 0.003 | — | 0.03 | 0.016 | V: 0.004 |
| D | 0.042 | 0.89 | 2.35 | 0.01 | 0.001 | 0.06 | 0.004 | 0.001 | 0.02 | 0.012 | — |
| E | 0.062 | 0.65 | 2.30 | 0.02 | 0.002 | 0.04 | 0.002 | 0.002 | 0.02 | 0.040 | Cr: 0.92 |
| F | 0.094 | 1.10 | 2.61 | 0.02 | 0.001 | 0.04 | 0.005 | 0.001 | 0.01 | 0.011 | — |
| G | 0.075 | 1.65 | 2.35 | 0.02 | 0.018 | 0.04 | 0.009 | 0.003 | 0.01 | 0.006 | Ni: 0.010 |
| H | 0.093 | 0.64 | 2.45 | 0.01 | 0.001 | 0.05 | 0.003 | 0.002 | 0.01 | 0.021 | — |
| I | 0.064 | 0.69 | 2.65 | 0.01 | 0.001 | 0.04 | 0.004 | 0.001 | 0.02 | 0.011 | Mo: 0.45 |
| J | 0.161 | 1.04 | 2.42 | 0.01 | 0.008 | 0.03 | 0.005 | 0.004 | 0.02 | 0.015 | — |
| K | 0.081 | 0.80 | 1.52 | 0.02 | 0.003 | 0.05 | 0.006 | 0.002 | 0.01 | 0.049 | — |
| L | 0.088 | 0.60 | 2.70 | 0.01 | 0.001 | 0.03 | 0.004 | 0.001 | 0.02 | 0.022 | Pb: 0.004, Cs: 0.005 |
| M | 0.073 | 1.88 | 2.73 | 0.02 | 0.002 | 0.03 | 0.005 | 0.003 | 0.01 | — | — |
| N | 0.083 | 0.004 | 2.40 | 0.01 | 0.001 | 0.05 | 0.003 | 0.001 | 0.03 | 0.032 | — |
| O | 0.082 | 0.83 | 2.68 | 0.02 | 0.002 | 0.05 | 0.005 | 0.004 | 0.02 | 0.021 | Ta: 0.005, Hf: 0.004 |
| P | 0.073 | 0.43 | 3.35 | 0.01 | 0.002 | 0.04 | 0.004 | 0.001 | 0.02 | 0.050 | — |
| Q | 0.072 | 0.82 | 2.50 | 0.01 | 0.008 | 0.05 | 0.004 | 0.002 | 0.02 | 0.020 | As: 0.006, Cr: 0.12 |
| R | 0.081 | 0.58 | 2.75 | 0.02 | 0.001 | 0.04 | 0.005 | 0.004 | 0.03 | 0.015 | REM: 0.24 |
| S | 0.094 | 0.64 | 2.75 | 0.01 | 0.001 | 0.06 | 0.003 | 0.002 | 0.01 | 0.024 | W: 0.006 |
| T | 0.102 | 0.76 | 2.30 | 0.01 | 0.002 | 0.03 | 0.005 | 0.004 | 0.02 | — | Zn: 0.08, V: 0.05 |
| U | 0.091 | 0.98 | 2.50 | 0.02 | 0.003 | 0.09 | 0.004 | 0.001 | 0.03 | 0.012 | Ca: 0.003 |
| V | 0.076 | 1.40 | 2.80 | 0.02 | 0.002 | 0.04 | 0.007 | 0.004 | 0.03 | 0.025 | Co: 0.011 |
| W | 0.073 | 0.02 | 2.76 | 0.01 | 0.001 | 0.06 | 0.003 | 0.005 | 0.03 | — | Sb: 0.004 |
| X | 0.075 | 0.92 | 3.10 | 0.02 | 0.002 | 0.05 | 0.004 | 0.002 | — | — | Mg: 0.0008 |
| Y | 0.081 | 0.65 | 2.05 | 0.02 | 0.001 | 0.05 | 0.005 | — | 0.02 | — | Sr: 0.006 |
| Z | 0.086 | 0.85 | 2.70 | 0.01 | 0.002 | 0.04 | 0.003 | — | — | 0.050 | — |
| AA | 0.086 | 0.85 | 2.60 | 0.02 | 0.002 | 0.03 | 0.005 | 0.001 | 0.02 | 0.080 | — |
| AB | 0.085 | 0.70 | 2.60 | 0.02 | 0.002 | 0.03 | 0.004 | 0.001 | 0.02 | 0.003 | — |
| AC | 0.082 | 0.65 | 2.67 | 0.01 | 0.003 | 1.92 | 0.003 | 0.002 | 0.01 | 0.015 | — |

*Underlines indicate items out of the range of the present invention.

TABLE 2

| No. | Steel Code | Hot Rolling Slab Heating Temperature (° C.) | Hot Rolling Finishing Delivery Temperature (° C.) | Hot Rolling Average Cooling Rate (° C./s) | Hot Rolling Coiling Temperature (° C.) | Cold Rolling Cold Rolling Reduction Ratio (%) | Annealing Annealing Temperature (° C.) | Annealing Annealing Time (s) | Annealing Average Cooling Rate to 600° C. (° C./s) | Annealing Number of Reverse bending through Rolls Having a Radius of 1500 mm or Less (time) | Annealing Cooling Stop Temperature (° C.) | Annealing Holding Time at Cooling Stop Temperature (s) | Note |
|---|---|---|---|---|---|---|---|---|---|---|---|---|---|
| 1 | A | 1250 | 900 | 22 | 520 | 52 | 800 | 80 | 20 | 3 | 500 | 75 | Example Steel |
| 2 | A | 1250 | 900 | 20 | 500 | 46 | 810 | 85 | 22 | 3 | 500 | 75 | Example Steel |
| 3 | A | 1250 | 900 | 6 | 500 | 55 | 810 | 85 | 20 | 2 | 490 | 75 | Comparative Steel |
| 4 | A | 1250 | 900 | 35 | 500 | 55 | 810 | 85 | 20 | 2 | 490 | 70 | Comparative Steel |
| 5 | B | 1250 | 900 | 25 | 510 | 50 | 810 | 80 | 25 | 3 | 500 | 75 | Example Steel |
| 6 | B | 1250 | 900 | 20 | 500 | 50 | 820 | 80 | 25 | 2 | 500 | 75 | Example Steel |
| 7 | B | 1250 | 900 | 25 | 460 | 50 | 815 | 80 | 25 | 3 | 500 | 75 | Comparative Steel |
| 8 | B | 1250 | 900 | 25 | 720 | 50 | 815 | 80 | 25 | 3 | 500 | 75 | Comparative Steel |
| 9 | C | 1250 | 900 | 28 | 520 | 55 | 810 | 85 | 28 | 3 | 510 | 70 | Example Steel |
| 10 | C | 1250 | 900 | 20 | 510 | 55 | 825 | 85 | 28 | 3 | 510 | 70 | Example Steel |
| 11 | D | 1250 | 900 | 18 | 490 | 50 | 810 | 90 | 25 | 2 | 500 | 75 | Comparative Steel |
| 12 | E | 1250 | 900 | 25 | 480 | 52 | 830 | 80 | 20 | 3 | 510 | 70 | Example Steel |
| 13 | E | 1250 | 900 | 25 | 480 | 52 | 730 | 80 | | | | | |
| 14 | E | 1250 | 900 | 25 | 480 | 52 | 910 | 80 | | | | | |
| 15 | F | 1250 | 900 | 15 | 500 | 50 | 790 | 90 | | | | | |
| 16 | F | 1250 | 900 | 15 | 500 | 50 | 790 | 20 | | | | | |
| 17 | F | 1250 | 900 | 15 | 500 | 50 | 790 | 220 | | | | | |
| 18 | G | 1250 | 900 | 12 | 660 | 45 | 820 | 150 | | | | | |
| 19 | H | 1250 | 900 | 20 | 520 | 50 | 810 | 70 | | | | | |
| 20 | I | 1250 | 900 | 20 | 510 | 50 | 820 | 90 | | | | | |
| 21 | J | 1250 | 900 | 25 | 520 | 50 | 810 | 100 | | | | | |
| 22 | K | 1250 | 900 | 22 | 560 | 50 | 800 | 80 | | | | | |
| 23 | L | 1250 | 900 | 20 | 510 | 55 | 820 | 70 | | | | | |
| 24 | L | 1250 | 900 | 20 | 510 | 55 | 820 | 70 | | | | | |
| 25 | L | 1250 | 900 | 20 | 510 | 55 | 810 | 70 | | | | | |
| 26 | M | 1250 | 900 | 15 | 520 | 50 | 790 | 80 | | | | | |
| 27 | N | 1250 | 900 | 15 | 520 | 50 | 790 | 85 | | | | | |
| 28 | O | 1250 | 900 | 15 | 520 | 50 | 830 | 85 | | | | | |
| 29 | O | 1250 | 900 | 15 | 520 | 50 | 830 | 80 | | | | | |
| 30 | O | 1250 | 900 | 15 | 520 | 50 | 830 | 80 | | | | | |
| 31 | P | 1250 | 900 | 20 | 500 | 55 | 810 | 80 | | | | | |
| 32 | Q | 1250 | 900 | 25 | 510 | 40 | 820 | 70 | | | | | |
| 33 | R | 1250 | 900 | 25 | 510 | 40 | 830 | 80 | | | | | |
| 34 | R | 1250 | 900 | 25 | 510 | 40 | 830 | 80 | | | | | |
| 35 | R | 1250 | 900 | 25 | 510 | 40 | 830 | 80 | | | | | |
| 36 | S | 1250 | 900 | 20 | 520 | 50 | 820 | 85 | | | | | |
| 37 | S | 1250 | 900 | 20 | 520 | 50 | 820 | 85 | | | | | |
| 38 | S | 1250 | 900 | 20 | 520 | 50 | 820 | 85 | | | | | |
| 39 | T | 1250 | 900 | 20 | 550 | 50 | 790 | 85 | | | | | |
| 40 | U | 1250 | 900 | 20 | 550 | 50 | 820 | 85 | | | | | |
| 41 | V | 1250 | 900 | 20 | 550 | 50 | 820 | 85 | | | | | |
| 42 | W | 1250 | 900 | 20 | 550 | 50 | 850 | 75 | | | | | |
| 43 | X | 1250 | 900 | 20 | 550 | 55 | 850 | 75 | | | | | |
| 44 | Y | 1250 | 900 | 20 | 550 | 55 | 840 | 75 | | | | | |
| 45 | Z | 1250 | 900 | 20 | 680 | 55 | 830 | 75 | | | | | |
| 46 | AA | 1250 | 900 | 20 | 520 | 55 | 810 | 75 | | | | | |
| 47 | AB | 1250 | 900 | 20 | 520 | 55 | 810 | 75 | | | | | |
| 48 | AC | 1250 | 900 | 20 | 510 | 55 | 810 | 75 | | | | | |

TABLE 2-continued

| | | | | | |
|---|---|---|---|---|---|
| <u>13</u> | 20 | 2 | 510 | 70 | Comparative Steel |
| <u>14</u> | 20 | 3 | 510 | 70 | Comparative Steel |
| 15 | 35 | 3 | 420 | 75 | Example Steel |
| <u>16</u> | 35 | 2 | 450 | 75 | Comparative Steel |
| <u>17</u> | 35 | 3 | 450 | 75 | Comparative Steel |
| 18 | 38 | 3 | 500 | 70 | Example Steel |
| 19 | 30 | 2 | 510 | 75 | Example Steel |
| 20 | 30 | 2 | 510 | 75 | Example Steel |
| <u>21</u> | 25 | 3 | 500 | 80 | Comparative Steel |
| <u>22</u> | 20 | 3 | 500 | 75 | Comparative Steel |
| 23 | 20 | 2 | 550 | 70 | Example Steel |
| <u>24</u> | <u>6</u> | 2 | 550 | 70 | Comparative Steel |
| <u>25</u> | <u>50</u> | 2 | 550 | 70 | Comparative Steel |
| <u>26</u> | 15 | 3 | 530 | 75 | Comparative Steel |
| <u>27</u> | 20 | 2 | 530 | 75 | Comparative Steel |
| 28 | 20 | 3 | 530 | 70 | Example Steel |
| <u>29</u> | 20 | <u>0</u> | 530 | 70 | Comparative Steel |
| <u>30</u> | 20 | <u>6</u> | 530 | 70 | Comparative Steel |
| <u>31</u> | 25 | 3 | 520 | 75 | Comparative Steel |
| 32 | 20 | 2 | 500 | 90 | Example Steel |
| 33 | 20 | 2 | 500 | 80 | Example Steel |
| <u>34</u> | 20 | 2 | <u>350</u> | 80 | Comparative Steel |
| <u>35</u> | 20 | 2 | <u>620</u> | 80 | Comparative Steel |
| 36 | 20 | 2 | 520 | 70 | Example Steel |
| 37 | 20 | 2 | 520 | <u>1</u> | Comparative Steel |
| <u>38</u> | 20 | 2 | 520 | <u>205</u> | Comparative Steel |
| 39 | 25 | 3 | 530 | 80 | Example Steel |
| 40 | 25 | 3 | 530 | 180 | Example Steel |
| 41 | 25 | 3 | 530 | 70 | Example Steel |
| 42 | 25 | 3 | 530 | 70 | Example Steel |
| 43 | 25 | 3 | 530 | 70 | Example Steel |
| 44 | 25 | 2 | 530 | 70 | Example Steel |
| 45 | 25 | 2 | 520 | 70 | Example Steel |
| <u>46</u> | 25 | 2 | 520 | 70 | Comparative Steel |
| 47 | 25 | 2 | 520 | 70 | Example Steel |
| 48 | 25 | 3 | 520 | 70 | Example Steel |

*Underlines indicate items out of the range of the present invention.

TABLE 3

| | Characteristics of Steel Sheet Microstructure | | | | | | | | | |
|---|---|---|---|---|---|---|---|---|---|---|
| | Martensite | | Ferrite Microstructure | | Total Volume Fraction of Martensite Grains Whose Average Grain Diameter Ratios with Respect to Adjacent Ferrite Grains Are ¼ or More and 1 or Less (%) | Steel Sheet Property | | | Load Range in Cross Tensile Fatigue Test | |
| No. | Volume Fraction of Martensite (%) | Average Grain Diameter (µm) | Fraction of Ferrite (%) | Average Grain Diameter (µm) | | YP (MPa) | TS (MPa) | EL (%) | (N) | Note |
| 1 | 60 | 4 | 38 | 6 | 70 | 610 | 1030 | 16.4 | 375 | Example Steel |
| 2 | 55 | 3 | 42 | 7 | 75 | 600 | 1010 | 16.7 | 350 | Example Steel |
| <u>3</u> | 77 | 6 | 20 | 4 | <u>20</u> | 635 | 1050 | 16.1 | 230 | Comparative Steel |
| <u>4</u> | <u>38</u> | 4 | 59 | 9 | <u>50</u> | <u>540</u> | 960 | 16.9 | 220 | Comparative Steel |
| 5 | 62 | 3 | 37 | 8 | 65 | 610 | 1035 | 16.3 | 370 | Example Steel |
| 6 | 65 | 4 | 35 | 7 | 66 | 642 | 1060 | 15.9 | 350 | Example Steel |
| <u>7</u> | 50 | 4 | 35 | 5 | <u>55</u> | 580 | 1010 | 16.7 | 210 | Comparative Steel |
| <u>8</u> | <u>39</u> | 5 | 60 | 10 | <u>53</u> | <u>530</u> | 945 | 17.3 | 215 | Comparative Steel |
| 9 | 53 | 3 | 42 | 5 | 65 | 620 | 1045 | 16.2 | 355 | Example Steel |
| 10 | 58 | 4 | 40 | 5 | 63 | 615 | 1055 | 16.0 | 360 | Example Steel |
| <u>11</u> | <u>35</u> | 2 | 61 | 9 | <u>55</u> | <u>530</u> | 950 | 17.2 | 230 | Comparative Steel |
| 12 | 45 | 5 | 50 | 7 | 62 | 550 | 985 | 17.2 | 260 | Example Steel |
| <u>13</u> | <u>36</u> | 4 | 60 | 9 | <u>45</u> | <u>535</u> | 960 | 17.6 | 200 | Comparative Steel |
| <u>14</u> | <u>76</u> | 7 | 22 | 2 | <u>5</u> | 645 | 1065 | 15.9 | 210 | Comparative Steel |
| 15 | 55 | 5 | 41 | 6 | 65 | 610 | 1020 | 16.6 | 350 | Example Steel |
| <u>16</u> | <u>39</u> | 3 | 50 | 11 | <u>40</u> | <u>540</u> | 965 | 17.5 | 220 | Comparative Steel |
| <u>17</u> | <u>38</u> | 3 | 45 | 10 | <u>30</u> | <u>535</u> | 955 | 12.2 | 240 | Comparative Steel |
| 18 | 50 | 4 | 45 | 8 | 65 | 550 | 990 | 17.6 | 320 | Example Steel |
| 19 | 48 | 4 | 55 | 6 | 70 | 600 | 1000 | 16.9 | 340 | Example Steel |
| 20 | 52 | 4 | 55 | 7 | 68 | 605 | 1010 | 16.7 | 350 | Example Steel |
| <u>21</u> | 65 | 5 | 35 | 9 | <u>40</u> | 620 | 1050 | 15.3 | 230 | Comparative Steel |
| <u>22</u> | <u>38</u> | 4 | 55 | 7 | <u>50</u> | <u>545</u> | 975 | 17.3 | 235 | Comparative Steel |
| 23 | 63 | 3 | 35 | 6 | 70 | 645 | 1065 | 15.9 | 365 | Example Steel |
| <u>24</u> | <u>38</u> | 4 | 60 | 7 | <u>45</u> | <u>545</u> | 965 | 17.5 | 220 | Comparative Steel |
| <u>25</u> | 70 | 5 | 26 | 5 | <u>55</u> | 635 | 1055 | 16.0 | 225 | Comparative Steel |

TABLE 3-continued

Characteristics of Steel Sheet Microstructure

| | Martensite | | Ferrite Microstructure | | Total Volume Fraction of Martensite Grains Whose Average Grain Diameter Ratios with Respect to Adjacent Ferrite Grains Are ¼ or | Steel Sheet Property | | | Load Range in Cross Tensile Fatigue | |
|---|---|---|---|---|---|---|---|---|---|---|
| No. | Volume Fraction of Martensite (%) | Average Grain Diameter (μm) | Fraction of Ferrite (%) | Average Grain Diameter (μm) | More and 1 or Less (%) | YP (MPa) | TS (MPa) | EL (%) | Test (N) | Note |
| 26 | 45 | 5 | 50 | 6 | 50 | 560 | 995 | 17.0 | 218 | Comparative Steel |
| 27 | 30 | 5 | 65 | 7 | 40 | 515 | 930 | 17.9 | 230 | Comparative Steel |
| 28 | 63 | 4 | 34 | 6 | 75 | 615 | 1040 | 16.3 | 368 | Example Steel |
| 29 | 59 | 2 | 36 | 10 | 52 | 595 | 995 | 17.0 | 230 | Comparative Steel |
| 30 | 60 | 2 | 35 | 10 | 50 | 600 | 1005 | 16.8 | 235 | Comparative Steel |
| 31 | 45 | 3 | 50 | 7 | 55 | 565 | 1000 | 16.9 | 240 | Comparative Steel |
| 32 | 46 | 5 | 52 | 9 | 62 | 555 | 990 | 17.1 | 310 | Example Steel |
| 33 | 58 | 5 | 40 | 8 | 70 | 610 | 1035 | 16.3 | 365 | Example Steel |
| 34 | 52 | 3 | 42 | 8 | 68 | 540 | 960 | 17.6 | 230 | Comparative Steel |
| 35 | 38 | 2 | 57 | 10 | 40 | 530 | 945 | 17.9 | 235 | Comparative Steel |
| 36 | 55 | 3 | 43 | 7 | 65 | 625 | 1050 | 16.1 | 368 | Example Steel |
| 37 | 50 | 5 | 45 | 5 | 50 | 570 | 1000 | 16.9 | 235 | Comparative Steel |
| 38 | 35 | 4 | 50 | 7 | 55 | 540 | 965 | 17.5 | 240 | Comparative Steel |
| 39 | 60 | 4 | 35 | 8 | 60 | 620 | 1045 | 16.2 | 325 | Example Steel |
| 40 | 56 | 3 | 42 | 7 | 65 | 550 | 985 | 18.1 | 350 | Example Steel |
| 41 | 43 | 4 | 52 | 8 | 62 | 560 | 1000 | 17.5 | 320 | Example Steel |
| 42 | 41 | 4 | 53 | 7 | 63 | 550 | 970 | 16.5 | 270 | Example Steel |
| 43 | 50 | 3 | 48 | 8 | 65 | 570 | 1010 | 16.7 | 265 | Example Steel |
| 44 | 53 | 4 | 40 | 7 | 65 | 560 | 1005 | 16.8 | 330 | Example Steel |
| 45 | 68 | 5 | 30 | 8 | 65 | 610 | 1040 | 16.3 | 340 | Example Steel |
| 46 | 75 | 6 | 20 | 7 | 50 | 640 | 1060 | 15.9 | 220 | Comparative Steel |
| 47 | 50 | 4 | 45 | 9 | 60 | 565 | 990 | 17.1 | 310 | Example Steel |
| 48 | 48 | 5 | 56 | 6 | 66 | 595 | 1000 | 16.7 | 305 | Example Steel |

*Underlines indicate items out of the range of the present invention.

The invention claimed is:

1. A high-strength steel sheet having
a chemical composition comprising, by mass %,
C: 0.05% to 0.15%,
Si: 0.01% to 1.80%,
Mn: 1.8% to 3.2%,
P: 0.05% or less,
S: 0.020% or less,
Al: 0.01% to 2.0%,
N: 0.010% or less,
one or more of B: 0.0001% to 0.005%,
Ti: 0.005% to 0.04%, and
Nb: 0.005% to 0.06%, and a balance being Fe and inevitable impurities,
a steel microstructure observed in a cross section in a thickness direction parallel to a rolling direction including 40% to 75% of a martensite phase in terms of volume fraction,
in which a total volume fraction of martensite grains whose average grain diameter ratios with respect to adjacent ferrite grains are ¼ or more and 1 or less is 60% or more with respect to an entire martensite phase, and
a yield strength (YP) of 550 MPa or more.

2. The high-strength steel sheet according to claim 1, wherein the chemical composition further comprises, by mass %, at least one selected from the groups A and B consisting of:
group A:
one or both of Mo: 0.03% to 0.50% and
Cr: 0.1% to 1.0% in a total amount of 1% or less; and
group B:
one or more of Cu, Ni, Sn, As, Sb, Ca, Mg, Pb, Co, Ta, W, REM, Zn, V, Sr, Cs, and Hf in a total amount of 0.5% or less.

3. The high-strength steel sheet according to claim 1, wherein the steel sheet further has a coating layer on a surface of the steel sheet.

4. The high-strength steel sheet according to claim 2, wherein the steel sheet further has a coating layer on a surface of the steel sheet.

5. A method for manufacturing the high-strength steel sheet according to claim 1, the method comprising:
a hot rolling process of performing hot rolling a steel slab having the chemical composition, cooling the hot-rolled steel sheet at an average cooling rate of 10° C./s to 30° C./s, and coiling the cooled steel sheet at a coiling temperature of 470° C. to 700° C.;
a cold rolling process of performing cold rolling the hot-rolled steel sheet obtained in the hot rolling process;
an annealing process of heating the cold-rolled steel sheet obtained in the cold rolling process to an annealing temperature range of 750° C. to 900° C., annealing the heated steel sheet for an annealing time of 30 seconds to 200 seconds, cooling the annealed steel sheet to a temperature of 600° C. at an average cooling rate of 10° C./s to 40° C./s while performing reverse bending through rolls having a radius of 1500 mm or less one or more times and 4 times or less in total, further cooling the steel sheet to a cooling stop temperature of 400° C. to 600° C., and holding at the cooling stop temperature for 2 seconds to 200 seconds; and thereby producing the high strength steel sheet according to claim 1.

6. A method for manufacturing the high-strength steel sheet according to claim 2, the method comprising:
a hot rolling process of performing hot rolling a steel slab having the chemical composition, cooling the hot-rolled steel sheet at an average cooling rate of 10° C./s to 30° C./s, and coiling the cooled steel sheet at a coiling temperature of 470° C. to 700° C.;

a cold rolling process of performing cold rolling the hot-rolled steel sheet obtained in the hot rolling process;

an annealing process of heating the cold-rolled steel sheet obtained in the cold rolling process to an annealing temperature range of 750° C. to 900° C., annealing the heated steel sheet for an annealing time of 30 seconds to 200 seconds, cooling the annealed steel sheet to a temperature of 600° C. at an average cooling rate of 10° C./s to 40° C./s while performing reverse bending through rolls having a radius of 1500 mm or less one or more times and 4 times or less in total, further cooling the steel sheet to a cooling stop temperature of 400° C. to 600° C., and holding at the cooling stop temperature for 2 seconds to 200 seconds; and thereby producing the high strength steel sheet according to claim 2.

7. The method for manufacturing a high-strength steel sheet according to claim 5, the method further comprising a coating process of performing a coating treatment on a surface of the steel sheet after the annealing process.

8. The method for manufacturing a high-strength steel sheet according to claim 6, the method further comprising a coating process of performing a coating treatment on a surface of the steel sheet after the annealing process.

\* \* \* \* \*